Nov. 7, 1939.   W. LEUKERT   2,179,337
RECTIFIER SYSTEM
Filed Dec. 17, 1937    2 Sheets—Sheet 1

WITNESSES:

INVENTOR
Wilhelm Leukert.
BY
ATTORNEY

Patented Nov. 7, 1939

2,179,337

UNITED STATES PATENT OFFICE 2,179,337

RECTIFIER SYSTEM

Wilhelm Leukert, Berlin-Siemensstadt, Germany, assignor to Westinghouse Electric & Manufacturing Company, East Pittsburgh, Pa., a corporation of Pennsylvania Application December 17, 1937, Serial No. 180,393
In Germany December 18, 1936

4 Claims. (Cl. 175—364)

My invention relates to electrical conversion systems and particularly to rectifying systems utilizing mechanical contact devices for successively connecting the phase terminals of a suitable rectifier transformer to one pole of the direct current circuit.

It has heretofore been proposed to utilize mechanical contact devices for successively connecting the phase terminals of an alternating current transformer to the similar pole of a direct current circuit in order to supply current from an alternating current circuit to a direct current load. These devices have been unsatisfactory because of sparking at the terminals of the contact device.

It has also been heretofore proposed to insert unidirectional conductors, such as electric valves, in series with each phase of the supply source and to open the mechanical contact device in such a manner as to prevent back firing or inverse conduction through the unidirectional conductors. In an arrangement according to my invention, the necessary valve paths have been reduced in number to a number corresponding to maximum simultaneously active phase terminals. For instance, in a polyphase system, such as a 6-phase diametrical system, the current is commutated from phase to phase so that only two phases are simultaneously active and, therefore, in an arrangement according to my invention, only two current paths are necessary.

It is also possible to control the output potential of such a mechanical type rectifier by delaying the instant during the positive half cycle when the contact is made with the terminals of the transformer device. Since this delay produces an increased peak voltage, it is necessary to supply a valve path having sufficient valve elements to successively withstand the maximum inverse potential. When such a system is operating without time delay, there is an unnecessary loss because of the serially connected valve elements and I propose to eliminate this unnecessary loss by providing means responsive to the angle of delay for controlling the active condition of the serially connected valve elements. This may be accomplished either by shorting out one or more of the valve elements or by a suitable switching connection for changing the valve elements from a series to a parallel connection dependent upon the angle of delay. This arrangement is particularly suitable when heavy currents are to be passed during the interval having little or no time delay.

When a mechanical contactor is operated with a time delay, difficulty has been experienced because of initial rush of current at the instant of making of the contacts. I have found that this initial rush of current can be eliminated by providing in series with each phase terminal of the transformer device a saturable reactor. Preferably, the saturable reactor is one which is saturated at a relatively low current value so that during the normal operation of the converter the reactor is saturated and produces little, if any, effect on the terminal voltage of the device. However, the saturation current should be sufficiently high that during the instant of time necessary to make a firm contact between the closing contact elements, the reactor will retard the current to a value insufficient to damage the contact elements.

It is a primary object of my invention to provide a mechanical converter system having a minimum number of valve paths for blocking the inverse potential to the individual phase terminals of the converter transformers.

It is a further object of my invention to provide a mechanical rectifying system having a regulatable terminal voltage.

It is a further object of my invention to provide a mechanical converter utilizing the most economical number of valve elements during the commutation interval, or the phase-to-phase commutation.

It is a further object of my invention to provide a mechanical rectifier system capable of operating with time delay and having means for preventing burning of the contact elements on contact.

Other objects and advantages of my invention will be apparent from the following detailed description, taken in conjunction with the accompanying drawings, in which.

Figure 1:
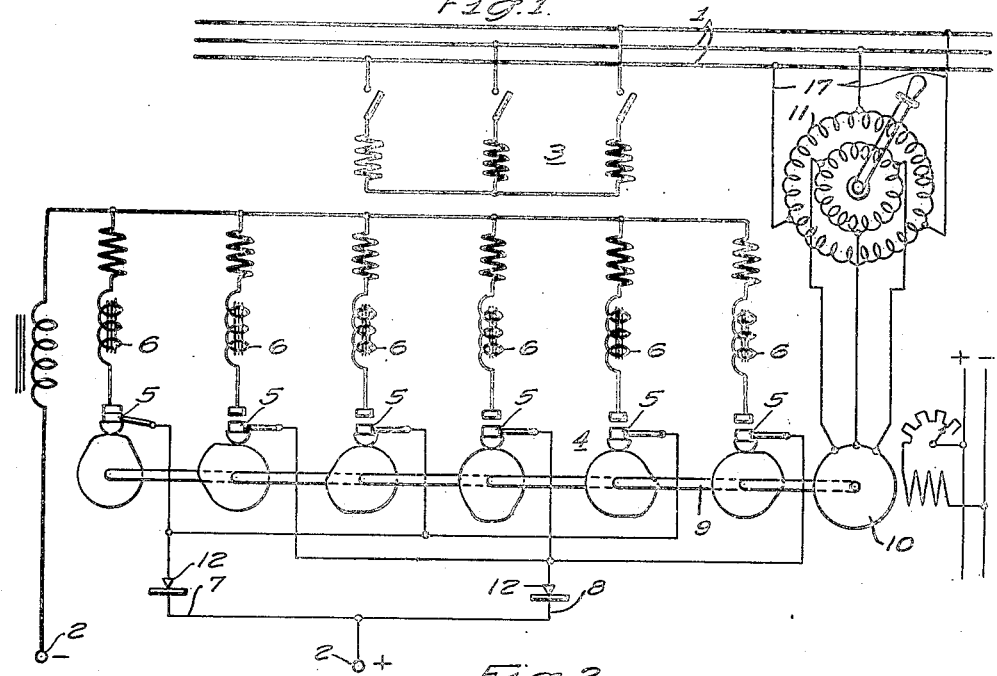
Figure 1 is a schematic illustration of a simplified converter according to my invention.

In the illustrative embodiment of my invention according to Fig. 1, an alternating current circuit 1 and a direct current circuit 2 are interconnected by means of a suitable converter transformer herein illustrated as a 6-phase diametrical transformer 3. The flow of current from the transformer 3 to the direct current circuit 2 is regulated by means of a mechanical switching device 4, which device has a plurality of contact elements 5 corresponding in number to the number of phase terminals of the converter transformer device 3. The contact elements 5 are operated to make contact with the transformer terminals in overlapping cyclic sequence, that is, the contact elements 5 make contact with the phase terminals at the instant when the positive cycle is applied to the individual phase terminal 6 and since it requires an appreciable time for transferring current from the succeeding to the receding phase, the contact elements 5 must necessarily overlap in time contact periods.

In order to prevent cross flow of current between the phase terminals 6 because of the difference in phase potentials a plurality of valve paths 7 and 8 are provided, preferably being connected to alternate successive contact elements 5 so that at any given commutation period, that is, during any given transfer of potential or current from one phase to a succeeding phase, the commutating phases are connected through two oppositely directed series connecting valve paths, one of which will reduce the current in the receding or outgoing phase to a value which can be successively opened by the mechanical contact device 4.

In order to permit regulation of the terminal voltage of the converter system, it is desirable to be able to advance or retard the time with respect to the voltage wave applied to the terminals of the transformer device 3. I accomplish this by driving the operating means 9 for the contact elements 5 by a suitable synchronous drive, such as a synchronous motor 10 and control the angular relation of the rotor of the synchronous machine 10 with respect to the time angle of the potential applied to the transformer 3 by means of a suitable phase shift device 11 in the supply circuit 17 to the driving motor 10, the terminal voltage of the converter being determined by advancing or retarding the phase shifting device 11 which, accordingly, advances or retards the synchronous running position of the driving motor.

Figure 4:
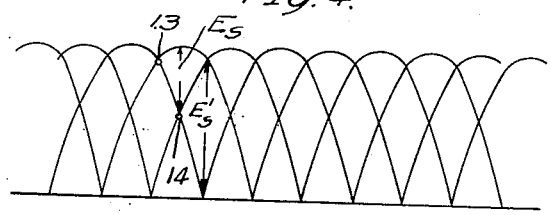
Fig. 4 is a diagrammatic illustration of the voltages appearing across the valve elements at different angles of delay.

When the converter is operative at various degrees of lag, it is necessary to provide a sufficient number of valve elements 12 in each of the valve paths 7 and 8 to withstand the maximum peak current forces as illustrated in Fig. 4, assuming the minimum angle of delay, that is, when the contact elements are closed at the instant when the succeeding and receding phases have the same terminal voltage as indicated at 13 and assuming a 30° overlapping in time, the maximum voltage potential appearing across the phase terminals is indicated by $E_s$. However, assuming an angle of delay of 30° as indicated at 14 and a similar 30° overlap period, the maximum potential appearing across the phase terminals is indicated by $E'_s$ which is approximately 86% of the total phase voltage.

Assuming that the inverter is supplied with sufficient voltage elements 12 to successfully withstand the maximum inverse potential $E'_s$ and is then operated at a lesser degree of lag, it is obvious that an unnecessary number of valve elements 12 is inserted in the valve paths 7 and 8 so that there is an unnecessarily heavy loss because of the series connected valve elements 12. Since all these elements 12 are not necessary at the smaller angles of lag, the loss because of these extra elements 12 may be eliminated by shorting out or otherwise switching the unnecessary valve elements 12. I accomplish this by providing a contact 15 controlled by the position of the phase shifter 11 controlling the angular position of the rotor of the synchronous driving motor 10.

Figure 2:
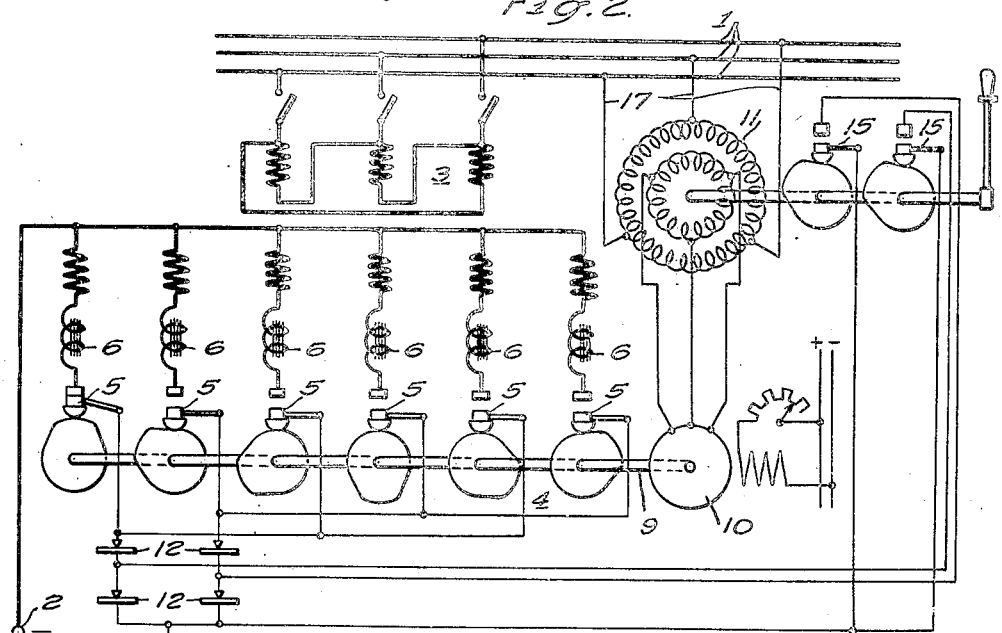
Fig. 2 is a similar view showing the manner of modifying the effective number of valve elements.
Figure 3:
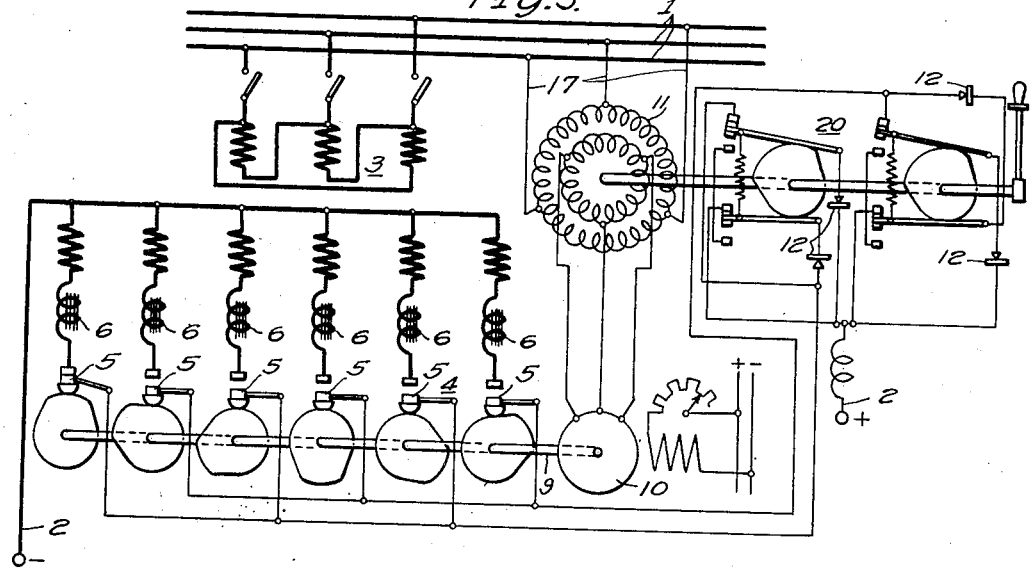
Fig. 3 is a fragmentary illustration of a modified form of switching device for controlling the active valve elements.

While, for simplicity of illustration, I have shown only one step, it is apparent that any desired number of steps can be controlled by the position of the phase shifter. Instead of shorting out the individual valve elements 12, as indicated in Fig. 2, the switching device 20 may be utilized to change the valve arrangement, as indicated in Fig. 3. For instance, in the arrangement according to Fig. 3, the individual valve elements 12 may be connected either in series or in parallel according to the position of the switching device 20. This is particularly useful when the converter is required to carry exceptionally heavy currents at the full load potential.

When the contact device 4 is operating at a large angle of lag, the incoming phase terminal voltage of the instant of contact is relatively quite large with respect to the voltage of the outgoing phase terminal voltage so that there is a tendency for the incoming phase to instantly supply the converter current. This results in an initial rush of current through the making contact which sometimes burns the contact elements. I prefer to insert in series with each phase terminal a saturable reactor 6. The reactor 6 is so designed that it saturates at a low current and offers little effective resistance at high current, however, the reactor delays the building up of the initial current for a time sufficient for the contact elements to come into firm engagement so that the burning is substantially eliminated.

Figure 5:
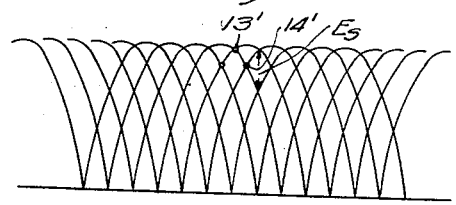
Fig. 5 is a similar diagram showing the voltage improvement to be gained by multiplication of the effective phases of the converter device.

In some instances, it is possible to utilize a multiplied number of effective phases in the converter transformer. For instance, if, as shown diagrammatically in Fig. 5, the phase numbers are increased from 6 to 12, the peak voltages appearing across the valve paths will be reduced one-half, as shown at 13' and 14', and the accompanying losses because of the number of valve elements 12 can be accordingly reduced.

While for purposes of illustration, I have shown and described specific embodiments of my invention, it will be apparent to those skilled in the art that many changes and modifications can be made therein without departing from the true spirit of my invention or the scope of the appended claims.

I claim as my invention:

1. An electric current converting system for transferring electric energy between an alternating current circuit and a direct current circuit comprising a transformer device having a plurality of phase terminals, a synchronous contact device for periodically making contact with said phase terminals in cyclic sequence, a plurality of valve paths connected to said contact device, said valve paths corresponding in number to the number of simultaneously active phases in said transformer device, each of said valve paths comprising a plurality of serially connected valve elements, a synchronous motor for driving said contact device, a phase shifting device for controlling the angular position of said contact device and means actuated by the position of said phase shifting device for determining the active number of valve elements in said valve paths.

2. A conversion system comprising an alternating current circuit, a direct-current circuit, transformer means interconnecting said circuits, a plurality of phase terminals on said transformer means, a contact device including a plurality of contact elements for periodically connecting said terminals in overlapping cyclic sequence to one side of said direct current circuit, a plurality of valve paths associated with said contact device, said valve paths including a plurality of valve elements, said valve path being connected to alternate contact elements of said contact device whereby during commutation the phase to phase circuit includes two valve paths having opposite current carrying directions, means for determining the instant of commutation with respect to the voltage impressed on said phase terminals, and switching means responsive to the setting of said time controlling means for determining the active number of the valve elements of each of said valve paths.

3. A conversion system for transferring electric energy between an alternating current circuit and a direct current circuit comprising a transformer device having a plurality of phase terminals, an interrupting device for periodically connecting said phase terminals in cyclic sequence to the direct current circuit, a plurality of valve current paths equal in number to the simultaneously active phases of said device, said valve current paths being respectively connected to said interrupting device whereby during the commutation period at the phase terminal two valve current paths of opposite current carrying direction are connected across the commutating phases, and a saturable reactor in series with each phase terminal for controlling the current therein at the instant of connection by said interrupting device.

4. An electric translating system comprising an alternating current circuit, a direct current circuit, transformer means connected to said alternating current circuit and having a plurality of phase terminals adapted for connection to one side of the direct current circuit, a control device for making contact with said phase terminals in overlapping cyclic sequence, a plurality of valve paths each including a plurality of valve elements connected between said contact device and said direct current circuit, said valve paths being connected to alternate phase sequence contact elements whereby during the interval of phase commutation two valve paths of opposite direction of conduction are interposed between the commutation phases, and means for varying the instant of contact by said contact device, and means responsive to the variation in contact time for varying the number of active valve elements composing each valve path.

WILHELM LEUKERT.